Feb. 3, 1970 D. F. SEEMANN ET AL 3,493,687

DISTRIBUTED TELEPHONE SYSTEM

Filed March 22, 1966

INVENTORS
D.F. SEEMANN-M.V. MANSUETTO-K.L. LISTON

BY Warren Whitehead

ATTORNEY

United States Patent Office 3,493,687
Patented Feb. 3, 1970

3,493,687

DISTRIBUTED TELEPHONE SYSTEM

Donald Francis Seemann, Lockport, Ill., Nicholas Victor Mansuetto, Centerport, N.Y., and Keith L. Liston, Upper Saddle River, N.J., assignors to International Telephone and Telegraph Corporation, a corporation of Delaware Filed Mar. 22, 1966, Ser. No. 536,401
Int. Cl. H04m 7/00
U.S. Cl. 179—18 7 Claims

ABSTRACT OF THE DISCLOSURE

This invention provides for the use of a plurality of PNPN switchboards in cascade. The rapid switching capabilities of such switchboards allow tandem offices to be driven in a step-by-step manner.

Figure 1:
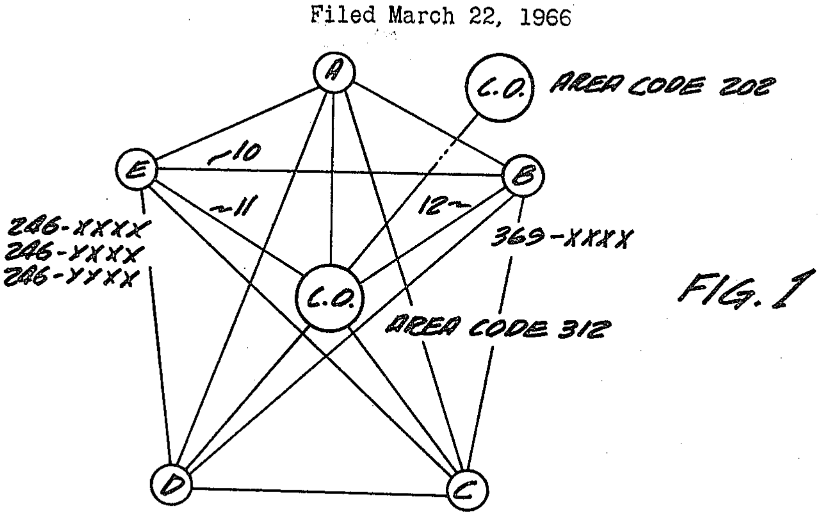

This invention relates to electronic switching systems, and more particularly to distributed switching systems, especially—although not exclusively—adapted for use in connection with telephone systems.

Switching systems are well known devices for interconnecting any two selected end points. These end points are usually called "inlets" or "outlets." Interposed between the inlets and outlets is a crosspoint network having a number of cascaded switching stages. Normally, the system operates by closing a crosspoint in each of these stages to complete a series circuit, called a "switching path," extending from a selected inlet through the network to a selected outlet. The particular crosspoints which close are determined by the numerical values of the digits in a "directory number" which a subscriber dials or otherwise transmits through the system.

The exact manner in which the network crosspoints are selected is not essential to the invention. However, for an example of a switching network particularly well suited to a use with this invention, reference is made to U.S. Patent 3,204,044 entitled, "Electronic Switching Telephone System, granted Aug. 31, 1965 to V. E. Porter, and assigned to the assignee of this invention. In that network, it is only necessary to apply a predetermined potential difference (called "marking" potentials) across an inlet and outlet at the two ends of a desired switch path. The resulting electrical stresses cause the crosspoints to close and open in a random manner until a path finds its way from one marked end point to another. When this path does so find its way, the two end points are connected together by a low impedance which virtually eliminates the entire potential difference across the end points. This relieves the electrical stress and ends the search for a path.

The systems which use these and other electronic networks have been changing rapidly during recent years. One of the more pronounced of these recent changes has been a movement in the general direction of a decentralization of the switching function. Thus, it is now commonplace to find concentrators at remote locations whereby a number of subscriber stations share a few common transmission channels extending between the outlying locations and a central office.

Usually, these and other decentralized systems require a duplication of parts. For example, concentrators generally require duplicate line circuits at the central office and at the outlying location. Very often, registers, translators, route preference selectors and the like are also duplicated at the various locations. In addition to directly increasing system costs, these equipment duplications generally slow the operations substantially, and thereby indirectly increase system costs by requiring a greater number of equipments to give an adequate grade of service.

Accordingly, an object of the invention is to provide new and improved decentralized switching systems. In this connection, an object is to provide a distributed switching system which does not require any substantial duplication of parts at the various locations. A further object is to prevent the system from operating at less than its maximum speed.

Another object of the invention is to provide an electronic switching system which is equally applicable to the communication needs of an undeveloped nation characterized by small settlements of few people separated from each other by many miles and of a large metropolitan area having many suburban areas. Here an object is to provide a private branch exchange (PBX) small enough to be economical for use in extremely limited areas such as buildings, shopping centers, or the like. Another object is to provide simple means for interconnecting a plurality of these PBX systems as a means of making relatively large exchanges.

Yet another object is to reduce costs by providing a hundred line PBX-size system which forms a basic switching module, a number of which can be ganged together to make a large system. Here, an object is to maintain the usual PBX switching system speeds despite the multipling of the PBX size modules.

In keeping with one aspect of this invention, these and other objects are accomplished by means of a basic PBX-size switching module having the capability of interconnecting a relatively few lines—such as a hundred lines, for example. An end marked network having self-seeking capabilities is used in each of these modules to provide extremely high speed switching. Thus, the modules may be driven directly by each subscriber sent digit without necessarily requiring the storage of a full complement of digits in any given PBX module; although, a number of digits may be stored, as required. Since no PBX module is necessarily required to store a full complement of digits, it may be provided with a register which may be reused a number of times to store a reduced number of succeeding digits in the same directory number.

Figure 2:
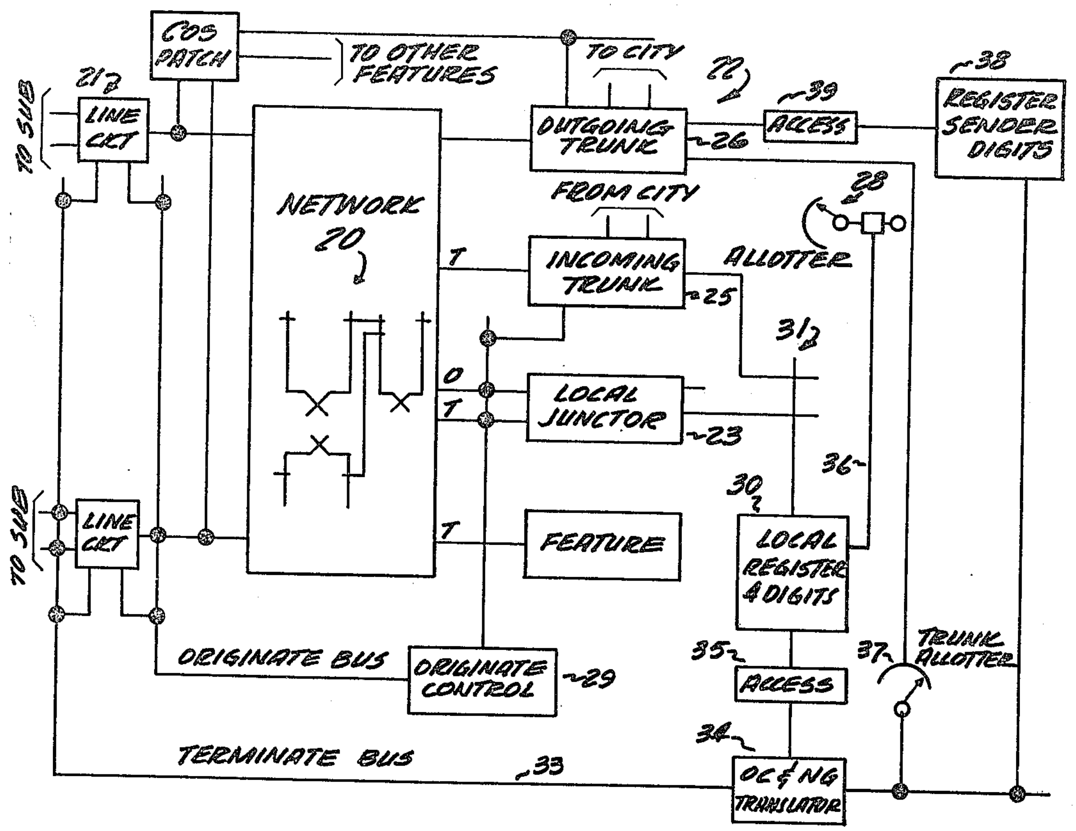

The above mentioned and other features of this invention and the manner of obtaining them will become more apparent, and the invention itself will be best understood by reference to the following description of an embodiment of the invention taken in conjunction with the accompanying drawings, in which:

FIG. 1 is a system layout showing how a number of PBX switching modules may be combined to provide a large coordinated system, and FIG. 2 is a block diagram showing how the invention may be incorporated into a PBX switching module, a number of which may be ganged together to provide a larger system.

The layout of FIG. 1 shows a hypothetical system having a central location C.O. and a plurality of outlying areas A–E. At one extreme, the central office C.O. may be a rural population center, and each outlying area A–E may be a remote settlement of an under-developed nation. At another extreme, the central office C.O. could be at the center of a suburban area, and the outlying areas could be in shopping centers, professional buildings, apartment houses, or the like. Each of these outlying areas A–E may be treated as a separate exchange driven by a separate block of local line numbers. Or a number of the areas A–E may share the same block of local line numbers. The decision of how to assign the line numbers is primarily one of economics and the local numbering plan. In this particular example, the area E (and perhaps the areas A and D also) could have an exchange identification "246," and the area B could have an exchange identification "369." The other areas could share these identifications or they could have different identifications, again as required by the system numbering plan.

By way of example, consider the switching at area E. If a local subscriber sends "246" as the first three digits in a directory number, the call is a local one, and it is not necessary for a continued storage of these digits throughout the entire switching process. Rather, all local switching is accomplished responsive to the last four digits in the directory number. If the first two of these last four digits are "XX," the call is to a subscriber connected to one PBX module. If the first two of these digits is either "YX" or "YY," the call is to a subscriber connected to one of two other PBX modules. Once the first two digits "XX," "YX," or "YY" are known, a given PBX module is selected, and it is no longer necessary to continue storing these two digits. The connection may now be completed responsive to the last two digits, here assumed to be "XX" in each case.

On the other hand, if the first three digits are "369," the call is for area B, and all seven digits must be used. None may be discarded. However, if the call is extended between areas E and B over a direct link 10, the number of digits required might be less than it would be if the call were extended through a tandem office via the links 11, 12.

If the first three numbers are "202," it means that the call is directed outside of the local area. Thus, ten or more digits may be required—these are the area code "202" plus seven digits for local use in the distant area. According to modern numbering plans, up to thirteen different digits may be required, depending upon the total routing requirements of the system.

The foregoing description has demonstrated that a PBX switching module in area E may require as many as thirteen or as few as two digits. People generally call other people who live nearby, and they avoid calling long distances if they can do so. Hence, there is a great and continued need for much equipment which responds to two, three, or four digits. There will be only a sporadic demand for equipment which may process the full thirteen digits for each and every call. Quite the contrary, in the example set forth in FIG. 1, it is never necessary to simultaneously store more than the four digits required for local switch control. Thus, a single register may be reused repeatedly to store first the three digits of an area code, then the three digits of an office code, and finally the four digits of a local selection code.

According to the invention, a self-seeking network of the type described in the above identified Porter patent is used as the switching element in the PBX-size switching module. Because of its inherent high speed, a number of these modules may be placed in a directly driven cascade to provide the desired large system capacity. Thus, the subscriber sent digit signals may directly drive the call forward in a somewhat step-by-step manner.

A Porter-type, self seeeking network of solid state crosspoints is shown at 20, FIG. 2. A plurality of line circuits 21 are connected to one (the originate) side of the network, and a plurality of trunk, link, or control circuits 22 are connected to the other (the terminate) side. The circuit identified as "COS PATCH" tells the class of service given to any subscriber. The switching network 20 is an all-electronic "space division" type employing an array of cascaded switching matrices utilizing PNPN diodes as crosspoints in a coordinate arrangement. The network has been designed to minimize the number of crosspoints per line consistent with a standardized family of switching matrix assemblies which allow a smooth and linear growth by simply plugging in extra printed circuit cards bearing PNPN diode matrices. The system concept depends on the use of a network that is an end marked, self seeking type. Consequently, switching control techniques require a minimum amount of logic and componentry.

A junctor 23 is a device for connecting two speech paths together and then supervising and holding a call until it is completed. A calling line circuit demands and completes a connection to the originate point of junctor access "0." Thereafter, a called line circuit identified by subscriber sent digital information completes a connection to the terminate point of junctor access T. When connected together in the junctor, these paths allow the two subscribers to talk to each other.

The features circuit 24 includes any suitable special purpose circuits for performing unique functions such as executive right of way, conference call, call transfer, etc. Those familiar with telephony will readily perceive the functions and purposes of a feature circuit.

Incoming trunk circuits 25 terminate transmission lines to a central office C.O. and extend one-way calls from another module located thereat to the local module shown in FIG. 2. Outgoing trunk circuits 26 extend one-way calls in the opposite direction from the local module over the transmission line to the central office C.O. The basic system may be expanded to incorporate any special purpose trunks, operator's or attendant's position, and other features, as required. Moreover, the trunks may extend, not to the central office, but to other switching areas as link 10 extends between are as E and B.

The system of FIG. 2 is controlled by a common clock here shown as an allotter 28 which may be a simple ring counter that allows individual ones of the control circuits 22 to mark the terminating side of the network 20 one at a time. In the idle state, any suitable source (not shown) drives the system allotter 28 continuously at 600 cycles per second. The allotter sends individual mark pulses to each junctor at the 600 cycle rate. When they are idle, junctors apply these 600 c.p.s. pulses to mark the terminate side of the network 20 to indicate that they are idle. When a line circuit 21 goes off-hook, it marks the originate side of the network 20 with a pulse of opposite polarity applied under the control of an originate control circuit 29. With both sides of the network 20 marked by pulses of opposite polarity, a path is automatically established through the network. Because of the simple nature of the control circuits, duplicate controls can be economically provided, even for small systems, in order to insure uninterrupted system operation.

When a number of modules are joined together, the various clocks may be synchronized. However, this is not necessary if each module is driven by separate digits.

Each junctor, incoming trunk, or other control circuit 22 capable of serving an originating connection has access to a register circuit 30. Preferably, this access is completed via a small auxiliary switching network 31. However, the invention also contemplates allowing the junctor-register association to be completed via the principal network 20. In the exemplary circuit shown in FIG. 2, the junctor 23 seizes an idle register 30 only after it has received a call at an originate terminal "0." At this time, the system is ready to process subscriber send digital information. The invention also contemplates a preassignment whereby an idle register is always connected to the junctor which is allotted as the next one to be taken into use. If all registers are busy, the originate control circuit 29 is inhibited so that a calling subscriber who is demanding service cannot cause his line circuit to mark the network 20. As far as that subscriber is concerned, this inhibition merely means that dial tone is a little slow coming on. Assuming that an adequate amount of equipment is provided, the delay in receiving dial tone cannot be noticed, considering the electronic speeds at which the system operates. In any event, the register 30 returns dial tone as soon as it is connected to a calling subscriber station and ready to receive his digit pulses.

Responsive to the dial tone, the subscriber dials the called number, and the line circuit causes the dial pulses to be extended through the network 20 and junctor 23 to the register 30. The register stores the indialed information and counts the number of pulse trains to determine when all of the dial information has been received. After the completion of the dialing and coincident with an allotter pulse which identifies the pertinent junctor, the information stored in the register is extended onto the terminate bus leads 33. Only the called line receives coincident pulses at a terminate gate connected to busses 33 and associated with its line circuit. Hence, only that line circuit marks the originate side of the network. The associated junctor simultaneously marks the terminate side of the network, thus causing a path to be established between the two end marked points. During the cycle, while a path is being completed from a called line to a junctor, the originating control circuit 29 blocks all other lines attempting to originate a call from gaining access to the network 20.

If the called line is busy when it receives a pulse over the terminate busses 33, its line circuit is prevented from marking the network when it receives such pulses via the terminate bus. Hence, a path is not established to the junctor. The junctor recognizes the absence of the path and, in turn, extends busy tone to the calling subscriber.

If the called line is idle, the junctor recognizes a completed path, extends ring-back tone to the calling subscriber, and causes the called line circuit to apply ringing current to the called subscriber station. When the called subscriber answers, his line circuit removes the ringing current from the line and passes answer supervision through the network 20 to the junctor. The junctor recognizes the answer supervision condition, removes the ring-back tone, and closes the speech path.

The path through the network 20 is held under the control of the calling party. When the call is over and the calling station goes on-hook, the path from that station to the junctor is released. The path from the junctor to the called party is held until the called party releases, which resets the junctor to its idle condition.

In keeping with an aspect of the invention, advantage is taken of the system's ability to complete switch paths extremely fast. Thus, there is no need to store a full complement of subscriber sent digits. Instead, it is possible to store only a limited number of digits and then to cancel this storage and reuse the storage capacity for storing later sent pulses.

In greater detail, to provide this function an office code and number group translator 34 is inserted between the register 30 and the terminate busses 33. From FIG. 1, it is apparent that in central office operation, a seven digit numbering plan is normally used for local calls and up to thirteen digits are required for network outdialing. Because of the inherent speed of electronic switching, translation, routing, and rerouting can be accomplished during the interdigit interval. Therefore, for economy purposes, the local register 30 of this system is arranged to provide the above digit handling capability (up to thirteen digits) with only four digit storage circuits in the local register.

A call between two local stations in the same exchange is indicated by the first three digits which are recognized as the local office code. The call is placed and given access to a junctor and register in the described manner. The register counts and stores each of the digits sent from the calling subscriber station. When the first three digits are received, they are sent via an access circuit 35 to the office code translator 34 during a register identifying and enabling time slot. In the case of local calls, the first three digits are decoded by the office code translator 34 and recognized as identifying a call remaining in its own exchange. The translator 34 then instructs the register 30 to drop back and erase the three digits which it has stored. Thereafter, the register 30 assepts the next four digits from the subscriber without going to translator 34. When all four of these digits are stored, they are sent to the number group translator 34. During the next pertinent register identifying time slot, the four digits of the called stations number are translated at 34 to identify the locations of the called line equipment. As the translated pulses are sent out on the terminating busses 33, the junctor 23 marks the terminate side of the network 20. The originate control circuit 29 inhibits all other lines to prevent them from originating a call. Only the line which is identified via the terminate busses 33 can mark the originate side of the network 20 during this time slot. Therefore, the resulting path is established from the marked line circuit to the terminate side T of the junctor. During the establishment of a path to a called line, the register marks a bus 36 and controls the system time, thus stopping all switching functions. This stoppage of system time will not exceed more than a few milliseconds.

The registers and translator are then released and made available for subsequent calls. The junctor causes the called party to be signalled and ring-back tone is returned to the calling party.

Next, assume that the first three digits indicate that the call is not a local one. For example, assume that the digits "369" are received and that they identify the call as one which must be extended to area B. If a direct link 10 is used, perhaps only the one digit "3" is all that is required. If tandem links 11, 12 are used, perhaps two or all three digits "369" are used.

A network out dial call is processed in much the same way as a local call is processed. The same method is used to access a junctor 23 and a register 30. This time, however, the translation of the first three digits or combination of digits in the office code translator 34 causes the register 30 to release the calling line. Simultaneously, the office code translator 34 causes a trunk allotter 37 to scan and allot an idle trunk to the indicated distant area B.

If either code conversion or the retransmission of spent in dialed digits is necessary, a trunk register sender 38 is marked by the office code translator with the proper digital information. An access circuit 39 then connects that register sender 38 to the trunk which has just been allotted. The allotted trunk marks the terminate side of the network 20, and a path is established between the calling line and the trunk during the interdigital period which occurs as the subscriber is dialing. The originally seized junctor may or may not release at this time; preferably it does. If a trunk register sender 38 is required, the calling party dials the balance of the digits into it. It stores the indialed information while it outpulses into the network responsive to the receipt of the usual stop-start dial supervisory signals. On the other hand, if translation in the office code translator 34 does not indicate the need of a trunk register sender 38, the calling party dials the balance of the digits directly into the network 20, through the outgoing trunk circuit 26 and to the central office via the city trunk.

The advantages of the invention shound now be apparent. The described PBX-size system is pacakaged in one-hundred line modular cabinets and arranged to provide for systems requiring, say, 25 or more lines. The PBX provides for an expansion of the system size from its minimum to its maximum size with only a little amount of labor since the PBX-size system is modular in hundred-line increments. Expansion within the hundred-line increments simply involves the plugging-in of additional printed circuit cards, and expansion beyond a hundred-lines simply requires the adding of a pare-wired, pre-tested cabinet and interconnecting cabling.

The system which so grows may extend calls through a number of modules in a sequential manner to gain the advantages of a step-by-step type of exchange without losing the benefit of a common controlled exchange. Thus, in the preferred embodiment described here, the subscriber's own intelligence drives the local exchange responsive to the first three digits and then optionally drives either a distant exchange or drops back and drives the local exchange responsive to the next four digits. Meanwhile, the available register may be used or reused to extract any added information by a digital position or other code. Finally, the register sender 38 may either transmit or regenerate spent digit pulses under command of the translator.

Finally, the question of whether the hundred-line PBX-size modules are set side by side or distributed over a wide geographical area is decided on the basis of convenience and economics. Usually, it is easier to connect all modules in a compact array in a single room or building. However, by lengthening interconnecting wires, synchronizing system clocks, and, perhaps, converting the form of some signals, it is not difficult to provide the remote switching capabilities generally expected from concentrators without the need for duplicating line circuits.

While the principles of the invention have been described above in connection with specific apparatus and applications, it is to be understood that this description is made only by way of example and not as a limitation on the scope of the invention.

We claim:

1. A distributed electronic switching system comprising a plurality of standard size modules, said modules being geographically separated, each of said modules having a network of solid state crosspoints whereby switching occurs at electronic speeds, means for operating successive modules as successive switching stages in a step-by-step manner to complete calls through different ones of said separated modules, said modules comprising register means for storing a limited number of subscriber sent digit signals, translator means accessed to said register means, said translator means determining from said limited number of digits the succeeding module required toward completion of the call, means responsive to output signals from said translator for connecting an outgoing trunk circuit to said network, means responsive to the connection of said outgoing trunk to said network for connecting the calling subscriber line to said outgoing trunk by switching through said network, the switching occurring during the inter-digital time periods so that succeeding subscriber sent digits directly drive the succeeding switching module without the necessity of a central control circuit in any of the successive modules.

2. The distributed electronic switching system of claim 1 including means for cancelling the storage of the limited number of digits in said register, means responsive to said limited number of digits indicating the necessity of connecting a succeeding module to said network, and means for thereafter re-using said storage means at least once for storing succeeding subscriber sent digit signals.

3. The system of claim 1 wherein said limited number of digits are the area or office code of a telephone directory number and said succeeding digits are the local switching command signals of said directory number.

4. The system of claim 1 wherein said network comprises a self-seeking space division network employing an array of cascaded matrices utilizing said solid state crosspoints in a coordinate arrangement.

5. The system of claim 4 and system clock means for restricting access to said network to one call at a time.

6. The system of claim 5 and means for synchronizing the clocks of each of said modules to run on a common time base.

7. The electronic switching system of claim 1 wherein said module operates as a digit absorber, said module comprising local junctor means for connecting said local junctor to said register storage means, means responsive to first sent directory number digits for causing said network to either switch through or to cause said register storage means to absorb said digits depending upon the numerical identity of said first sent digits for either switching through said network or driving the equipment seized by switch through responsive to succeeding subscriber sent directory number digits.

References Cited

UNITED STATES PATENTS

| | | |
|---|---|---|
| 3,231,676 | 1/1966 | Carlstrom et al. |
| 3,316,354 | 4/1967 | Suala. |
| 2,941,042 | 6/1960 | Joel. |
| 3,131,262 | 4/1964 | Avery. |
| 3,204,038 | 8/1965 | Seemann et al. |
| 3,204,044 | 8/1965 | Porter. |
| 3,244,813 | 4/1966 | Schreiner. |

KATHLEEN H. CLAFFY, Primary Examiner

WILLIAM A. HELVESTINE, Assistant Examiner